Jan. 22, 1957 L. B. YOUNG 2,778,993
IMPEDANCE BRIDGE
Filed Dec. 10, 1945 2 Sheets-Sheet 1

INVENTOR
LOUIS B. YOUNG
BY M. O. Hayes
ATTORNEY

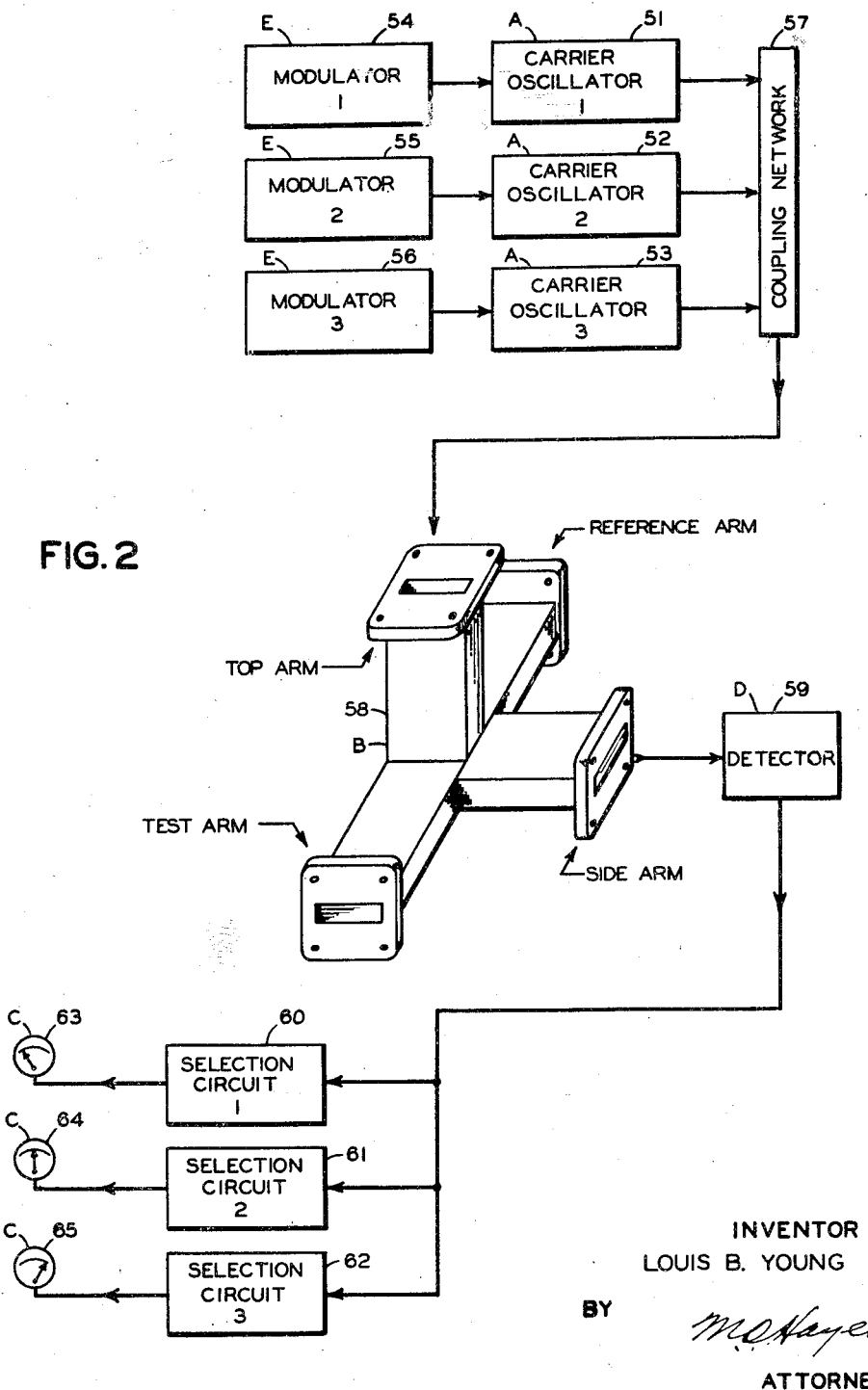

United States Patent Office 2,778,993
Patented Jan. 22, 1957

2,778,993

IMPEDANCE BRIDGE

Louis B. Young, Cambridge, Mass., assignor, by mesne assignments, to the United States of America as represented by the Secretary of the Navy Application December 10, 1945, Serial No. 634,115

13 Claims. (Cl. 324—58)

This invention relates to impedance bridges, and more particularly, those wherein the bridge network is formed by microwave transmission lines.

The basic concept of the microwave wave guide T-bridge, or T-junction, or Magic-T as it is commonly referred to in the art, was disclosed and claimed in the copending application of Robert L. Kyhl, Serial Number 580,014, filed February 27, 1945, on "Transmission Systems," now abandoned. The Magic-T is one example of a class of 8-terminal networks whose impedance matrices possess certain symmetry properties. These networks, which are a form of bridge circuit, can be realized with lumped constants, with microwave or long line elements, or with combination of these.

To form a T-bridge comprising wave guides, the axes of four branches must meet in a point. A first and second of these branches must be symmetrical with respect to a plane which passes through the axes of the third and fourth branches, and which plane is also perpendicular to the electric lines of force within one of the third and fourth branches. The third and fourth branches are so disposed that the electric lines of force therein are mutually perpendicular. Differently stated, the Magic-T is a combination of an E-plane and an H-plane T. If constructed with perfect mechanical symmetry there can be no coupling from the E-plane arm to the H-plane arm, or vice versa. The electric vectors in these two arms are normal to each other, so that there can be no coupling through the electric fields. Moreover, the planes of the magnetic links in the two arms are also perpendicular, and this fact, together with the fact that the intersection of these planes lies on the plane of symmetry of the T, prevents direct magnetic coupling. The T-bridge can include irises or other matching devices so arranged and of such dimensions that when the bridge is observed from any branch, that branch is terminated in its characteristic impedance.

All of the symmetry requirements frequently placed on Magic-T networks are not essential for their use as impedance bridges. A junction commonly termed a side outlet T meets the requirements for impedance bridge measurements. This junction is similar to the Magic-T in that it is a combination E-plane and H-plane T. The distinction between side outlet T and Magic-T is that the latter has the aforementioned mechanical tuning element to compensate for any mechanical imperfections of construction.

Other characteristics of the side outlet T will be discussed in their particular application to the present invention as the specification for the embodiments herein described warrants.

In research and production testing on R.-F. components requiring broadbanding, it is desirable to be able to make voltage standing wave checks at several distinct frequencies simultaneously. Among the many specific tasks for a voltage standing wave measuring equipment would be the adjustment of tunable components for minimum standing waves, the sorting and rejection of components which must have a voltage standing wave ratio less than some specified value, and the measurement of the absolute magnitude of voltage standing wave ratio of components.

It is an object of this invention, therefore, to provide apparatus for making simultaneous measurements of the voltage standing wave ratio of a component under test at one or more distinct frequencies.

It is another object to provide apparatus to aid in adjusting tunable components for minimum voltage standing wave ratio at one or more distinct frequencies.

A further object is to provide apparatus which will furnish a basis for the selection or rejection of components which must have a voltage standing wave ratio less than some specified value at one or more distinct frequencies.

These and other objects will be more apparent upon consideration of the following specifications, taken in connection with the accompanying drawings, forming a part thereof, in which:

Fig. 2 is a block diagram of an impedance bridge of the meter indicator type.

Figure 1:
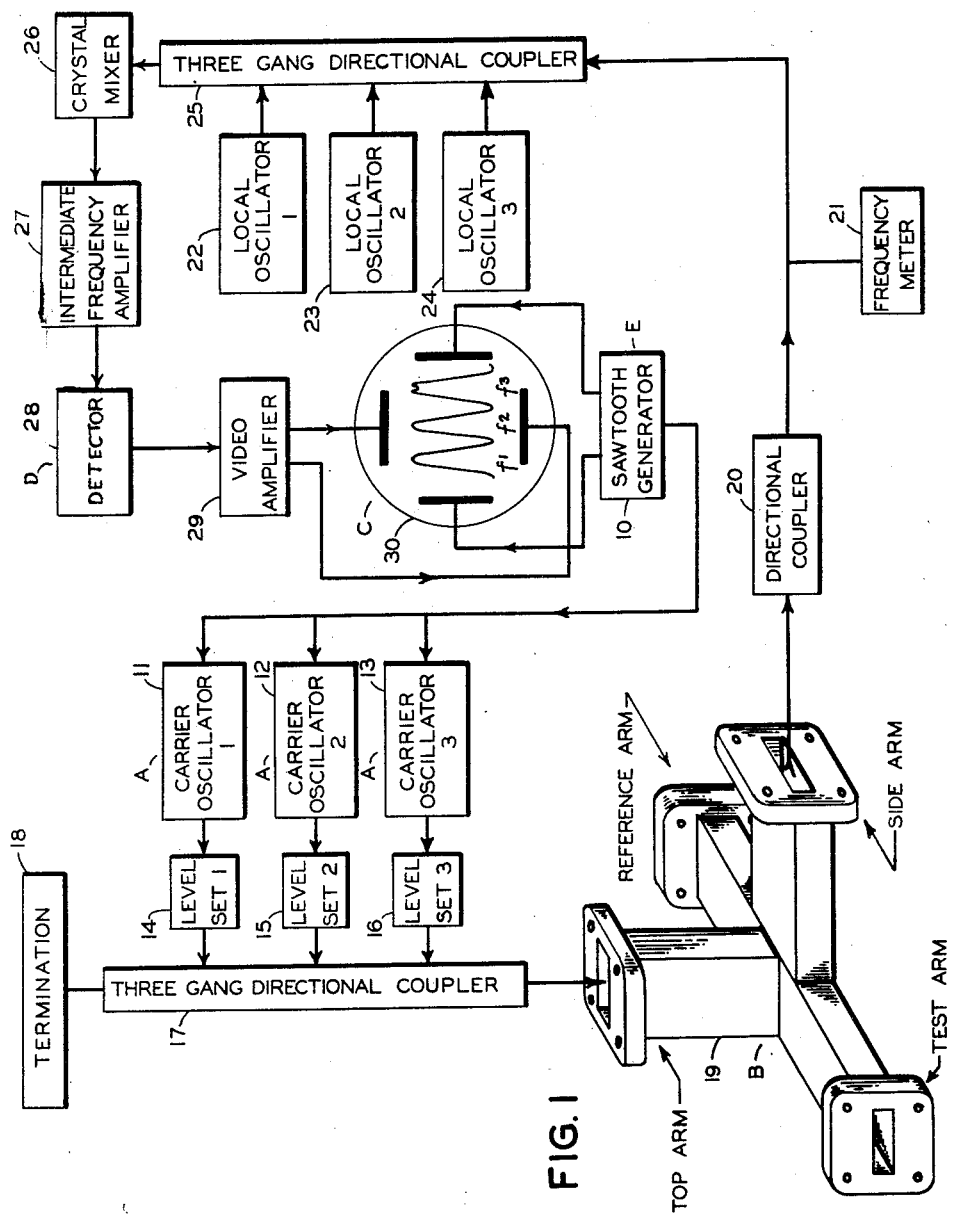
Fig. 1 is a block diagram of an impedance bridge of the heterodyne type.

Referring to both forms of the invention as shown in Figs. 1 and 2, the invention includes generically, one or more oscillators A for providing, simultaneously, a similar number of test frequencies. The oscillator outputs are coupled to the input arm of bridge network B, the bridge being formed of transmission lines, with connections available for a reference termination and a component to be tested. The output of the bridge is indicated at C. The result is an indication of the voltage standing wave ratio of the component under test at the several test frequencies, the indications being simultaneous. For most types of indicators it is preferable to use a detector D for detecting the bridge output. The distrimination of the various test frequencies at the bridge output, and their indication, may be aided by using a means E for modulating said oscillators A.

In the embodiment shown in Fig. 1, the side outlet T 19 serves as a bridge (or bridge network) which is used in an unbalanced condition. The bridge is fed with three frequencies simultaneously from three frequency modulated carrier oscillators 11, 12 and 13. The output due to bridge unbalance is combined with the output of fixed frequency local oscillators 22, 23 and 24 in a mixer 26. Each like numbered carrier oscillator and local oscillator pair (i. e. carrier oscillator 1 and local oscillator 1) is tuned so that a predetermined difference frequency exists at some point of the frequency sweep of the carrier oscillator. This difference, or intermediate frequency is amplified at 27, detected at 28, and applied to a cathode ray tube 30. The amount of unbalance of the bridge at each of the three test frequencies is indicated by the heights of the three signals on the screen.

Considering Fig. 1 in greater detail, a sawtooth generator 10 applies a sawtooth voltage to the sweep deflection plates of cathode ray tube 30, and also to the repeller electrodes of carrier oscillators 11, 12 and 13. Any oscillator capable of being frequency modulated over a relatively small frequency range can be employed, reflux klystrons being used in the present embodiment. Attenuators 14, 15 and 16, herein termed level set 1, 2 and 3, are interposed between the carrier oscillators and a common transmission line, to permit adjustment of the signal impressed on bridge 19. In the present case the connection to the common wave guide is made by means of a three-gang directional coupler 17, the directional coupler serving to decouple the carrier oscillators. The unused end of the common waveguide is closed with an absorbing termination 18 to reduce the voltage standing wave ratio as seen from the bridge 19. As used here, the reference arm of bridge 19 is terminated in a matched load, and the component to be tested is connected to the test arm. Input power from the carrier oscillators is applied to the top arm (E-arm), and the output is taken from the side arm (H-arm). Although no power can be coupled directly from the E-arm to the H-arm, the wave reflected from the mismatched test component can couple power into the H-arm. Consequently, for constant power input to the E-arm, the power delivered into the H-arm can be used as a measure of the voltage standing wave ratio of the test specimen. By using impedances of known voltage standing wave ratio to calibrate the bridge, the absolute magnitude of the voltage standing wave ratio of an unknown can be determined. It should be noted that the functions of the branches labeled "top arm" and "side arm" could be interchanged without altering the operation.

The output of the bridge, as taken from the side arm is applied to directional coupler 20, which keeps the voltage standing wave ratio looking out of the bridge low. The output from directional coupler 20 is applied to mixer 26, in this case a crystal. Frequency meter 21, built into the line between coupler 20 and mixer 26, will reflect, when on resonance, some of the power passed by coupler 20. This reflection distorts the output pip appearing on the screen of cathode ray tube 30, as is indicated at $f_3$, so that the frequency meter reads the test frequency.

The output of fixed frequency local oscillators 22, 23, and 24 is applied through three-gang directional coupler 25 to the input of mixer 26. Each like-numbered carrier frequency oscillator and local oscillator pair is tuned so that a predetermined difference frequency, or intermediate frequency, exists at some point of the frequency sweep of the carrier oscillator. This frequency sweep should be less than twice the intermediate frequency in order to prevent two intermediate frequency beats from one carrier oscillator and local oscillator combination. Each such intermediate frequency beat produced by the mixer is selected and amplified by intermediate frequency amplifier 27. These signals are detected at 28, and the resulting video signals are amplified at 29 and applied to the signal deflection plates of cathode ray tube 30. Thus, the signals resulting from unbalance of the bridge at the three test frequencies appear as pips on the screen. The separation of these pips can be changed by changing the time on the frequency sweep at which the intermediate frequency beat is produced, this being done most conveniently by adjustment of the frequency of the local oscillators.

By connecting an adjustable calibrated termination, or a known impedance, to the test arm, it is possible to obtain a reference level and/or calibration lines on the screen, which, for a given setting of the level set adjustments, will provide a basis for production testing of components such as attenuators, antennas, thermistor mounts, duplexers, directional couplers, rotating joints, and other such items. If, as sometimes happens, a manufactured item should have a definite impedance other than the line impedance, instead of putting a match on the reference arm, it is possible to use as a standard a unit having the desired impedance. Then if the test item has the same impedance, the bridge will be balanced. Instead of measuring the voltage standing wave ratio of the unknown, the indicator will show any degree of difference between the unknown and the standard.

Although a number of uses have been named, it is not the purpose of these specifications to limit the scope of use of the invention as specified in either of the two embodiments disclosed. Many adaptations, other than the ones suggested, will be apparent to one versed in the art.

In the embodiment just described, the radio frequency oscillators were frequency modulated. The mismatch at the respective radio frequencies was broken down into components by means of a heterodyning technique, using a local oscillator for each component. In the embodiment to be described in connection with Fig. 2, the oscillators are amplitude modulated, the modulation frequency of each oscillator being different. This difference is the basis used for discrimination between the power outputs representing mismatches at the various radio frequencies.

Referring more particularly to Fig. 2, three carrier oscillators 51, 52 and 53 each oscillate at a different radio frequency, these frequencies being chosen at various points in the band over which it is desired to test the unknown component for mismatch. These carrier oscillators are amplitude modulated by modulators 54, 55 and 56. Though not necessary, it is contemplated that the type of amplitude modulation of each of the oscillators would be the same, for example, they might all be pulse modulated, or square wave modulated, but at different modulation frequencies.

The output of the oscillators is applied through coupling network 57 to the input arm of side outlet T 58. Coupling network 57 may be the same type of three-gang directional coupler as previously referred to. The bridge is the same as that described in connection with the first embodiment of the invention, with connections available for a reference termination and for a component to be tested. The output of the bridge is applied to a broadband detector 59 and then to selection circuits 60, 61 and 62. The selection circuits may contain filters and rectifiers, or other convenient means for producing output currents which are proportional to the output power of side outlet T 58 at the various modulation frequencies, and hence at the corresponding radio frequencies. As a result, meters 63, 64 and 65 indicate simultaneously the degree of mismatch of the component under test at the respective radio frequencies.

It is believed that the construction and operation of my invention, as well as the advantages thereof, will be apparent from the foregoing description. It will be understood that while I have shown and described my invention in two particular embodiments, changes may be made in the circuits disclosed without departing from the invention, as sought to be defined in the following claims.

What is claimed is:

1. An impedance bridge comprising, a plurality of oscillators for providing simultaneously a plurality of test frequencies, means for modulating said oscillators, an unknown impedance element, an impedance bridge, said element forming one arm of said bridge, means energizing said bridge from the output of said modulated oscillations, a detector coupled to said bridge whose output is simultaneously proportional to the magnitude of the instantaneous unbalance of said bridge at each of said plurality of test frequencies and means for indicating concurrently said detector output at each of said test frequencies.

2. A multifrequency impedance bridge for microwave components comprising, a plurality of modulated microwave oscillators generating a plurality of differing test frequencies, a microwave wave guide side outlet T-junction, means to energize said wave guide junction simultaneously from said oscillators, a microwave circuit component to be tested, a microwave circuit component having standard known values, means for coupling said components into said T-junction to form an impedance bridge circuit, means coupled to said side outlet T-junction for detecting unbalance in said bridge circuit and means for indicating concurrently the unbalance at each of said frequencies.

3. A multifrequency microwave impedance bridge comprising, a standard reference microwave circuit component, a microwave circuit component whose characteristics are unknown, a plurality of microwave oscillators of differing test frequencies, a plurality of microwave wave guide elements intersecting in a side outlet T-junction for coupling said plurality of microwave oscillators, said reference component and said unknown component together in a wave guide T-junction impedance bridge, means coupled to said side outlet T-junction for simultaneously detecting unbalance in said bridge circuit at each test frequency, and means for concurrently indicating said unbalance.

4. A multifrequency microwave impedance bridge comprising, means for generating a saw-tooth voltage, a plurality of oscillators which are frequency modulated by said saw-tooth voltage, a standard reference microwave circuit component, a microwave circuit component whose characteristics are unknown, a plurality of microwave wave guide elements intersecting in a side outlet T-junction for coupling said plurality of oscillators, said reference component and said unknown component together in a wave guide T-junction impedance bridge, a plurality of local oscillators operating at predetermined fixed frequencies, a mixer coupled to said side outlet T-junction and responsive to the carrier frequency unbalance outputs of said bridge and the outputs of said local oscillators, thereby to produce signals at a predetermined intermediate frequency, a detector for said intermediate frequency signals and a cathode ray indicator, means to apply said saw-tooth voltage to said cathode ray indicator to supply a sweep deflection, and means to apply said detector output signals to said cathode ray indicator to supply signal deflections.

5. A multifrequency microwave impedance bridge comprising, a standard reference microwave circuit component, a microwave circuit component whose characteristics are unknown, a plurality of microwave oscillators of differing test frequencies, a plurality of amplitude modulators adapted to modulate said plurality of microwave oscillators at frequencies which are not multiples of one another, a plurality of microwave wave guide elements intersecting in a side outlet T-junction for coupling said plurality of microwave oscillators, said reference component and said unknown component together in a wave guide T-junction impedance bridge, means coupled to said side outlet in T-junction for simultaneously detecting unbalance at each of said test frequencies in said bridge circuit, a plurality of output circuits adapted to discriminate between said different modulation frequencies, means for concurrently indicating the output of each of said output circuits, and means for applying the output of said detecting means to each of said discriminator output circuits.

6. A multifrequency impedance bridge comprising an unknown impedance element, a bridge circuit, said impedance element forming one arm of said bridge, a plurality of oscillators differing in frequency, means for modulating said oscillators periodically, means for simultaneously energizing said bridge with the modulated outputs of said oscillators, means for detecting brdige unbalance simultaneously at said plurality of test frequencies, and means responsive to the modulation and amplitude of the output of said detecting means to display concurrently the bridge unbalance at each of said plurality of frequencies.

7. A multifrequency impedance bridge comprising four wave guide arms of substantially the same impedance connected together at a common junction point, two of said arms being aligned, the remaining two of said arms being perpendicular to one another and to said aligned arms, a known impedance coupled to one of said aligned arms, an unknown impedance coupled to the other of said aligned arms, a plurality of oscillators, each generating a microwave signal at a predetermined separate frequency, means for modulating the output of said oscillators, means for coupling said oscillators to a common transmission line, means coupling said transmission line to one of said remaining two arms, and means coupled to the other of said remaining two arms for indicating the amplitude of signals passed by said aligned arms.

8. A multifrequency impedance bridge comprising four wave guide arms of substantially the same impedance connected together at a common junction point, two of said arms being aligned, the remaining two of said arms being perpendicular to one another and to said aligned arms, a known impedance coupled to one of said aligned arms, an unknown impedance coupled to the other of said aligned arms, a plurality of oscillators, each generating a microwave signal at a predetermined separate frequency, means for modulating the output of said oscillators, means for coupling said oscillators to a common transmission line, means coupling said transmission line to one of said remaining two arms, means coupled to the other of said remaining two arms for detecting bridge unbalance, and means for indicating the output of said detecting means.

9. A multifrequency impedance bridge comprising four wave guide arms of substantially the same impedance connected together at a common junction point, two of said arms being aligned, the remaining two of said arms being perpendicular to one another and to said aligned arms, a known impedance coupled to one of said aligned arms, an unknown impedance coupled to the other of said aligned arms, a plurality of oscillators, each generating a microwave signal at a predetermined separate frequency, means for coupling said oscillator to a common transmission line, means coupling said transmission line to one of said remaining two arms, means coupled to the other of said remaining two arms for detecting bridge unbalance, a cathode ray indicator, a sawtooth wave generator, means for modulating the output of said oscillators in response to the amplitude of the output of said sawtooth wave generator, means to apply the output of said sawtooth wave generator to said cathode ray indicator to deflect said ray horizontally, and means to apply the output of said detecting means to said cathode ray indicator to deflect said beam vertically to display the unbalance of said bridge at each of said plurality of frequencies.

10. Apparatus for making simultaneous measurements of a microwave component under test at several distinct frequencies comprising an impedance bridge circuit, said microwave component forming one arm of said bridge, a sawtooth wave generator, a plurality of carrier oscillators differing in frequency, means applying the output of said generator to said carrier oscillators to modulate the frequency thereof, means for independently adjusting the output amplitude of each carrier oscillator, means for energizing said bridge simultaneously by the frequency modulated outputs of said carrier oscillators, a plurality of local oscillators, each of said local oscillators being tuned to a frequency such that a predetermined frequency difference occurs during the frequency modulation of a carrier oscillator, means for heterodyning the output of said bridge with the outputs of said local oscillators to obtain output signals at said difference frequency having amplitudes representative of bridge unbalance, and means for displaying said output signals as a function of said sawtooth wave to indicate bridge unbalance separately at each test frequency.

11. Apparatus for making simultaneous measurements of a microwave component under test at several distinct frequencies comprising, an impedance bridge circuit, said microwave component forming one arm of said bridge, a sawtooth wave generator, a plurality of carrier oscillators differing in frequency, means applying the output of said generator to said carrier oscillators to modulate the frequency thereof, means for independently adjusting the output amplitude of each carrier oscillator, means for energizing said bridge simultaneously by the frequency modulated outputs of said carrier oscillators, a plurality of local oscillators, each of said local oscillators being tuned to a frequency such that a predetermined frequency difference occurs during the frequency modulation of a carrier oscillator, means for heterodyning the output of said bridge with the outputs of said local oscillators to obtain output signals at said difference frequency having amplitude representative of bridge unbalance, a cathode ray indicator, means applying the output of said sawtooth wave generator to said indicator to deflect said ray horizontally, and means for applying said output signals to deflect said beam vertically whereby the amplitude of bridge unbalance at each test frequency is displayed separately.

12. An impedance bridge comprising, means for generating a sawtooth voltage, a plurality of carrier oscillators which are frequency modulated by said sawtooth voltage, an impedance bridge energized by the modulated outputs of said carrier oscillators, a plurality of local oscillators each operating at a predetermined fixed frequency, a mixer responsive to the carrier frequency unbalance output of said bridge and the outputs of said local oscillators and producing signals at an intermediate frequency, a detector for said intermediate frequency signals, and a cathode ray indicator, means applying said sawtooth voltage to said cathode ray indicator to cause sweep deflection, and means applying said detector output to said cathode ray indicator to cause signal deflection.

13. An impedance bridge comprising, means for generating a sawtooth voltage, a plurality of networks in parallel, each network including a carrier oscillator which is frequency modulated by said sawtooth voltage and an amplitude attenuator, means coupling said parallel networks to a common transmission line, an impedance bridge, one arm of said bridge being connected to said common transmission line, terminals for connecting a reference termination in a second arm of said bridge, terminals for connecting a component to be tested in a third arm of said bridge, a mixer to which the output from the fourth arm of said bridge is connected, a plurality of local oscillators connected to the input of said mixer, an intermediate frequency amplifier connected to the output of said mixer, a detector connected to the output of said intermediate frequency amplifier, and a cathode ray indicator, the aforesaid sawtooth voltage supplying sweep deflection to said cathode ray indicator, and said detector output supplying the signal deflection.

References Cited in the file of this patent

UNITED STATES PATENTS

| | | |
|---|---|---|
| 1,665,325 | Peterson | Apr. 10, 1928 |
| 1,816,958 | Clark et al. | Aug. 4, 1931 |
| 2,200,819 | Bohannon | May 14, 1940 |
| 2,252,058 | Bond | Aug. 12, 1941 |
| 2,380,791 | Rosencrans | July 31, 1945 |
| 2,411,553 | Ramo | Nov. 26, 1946 |
| 2,416,790 | Barrow | Mar. 4, 1947 |